US012617898B2

(12) United States Patent
Nowak et al.

(10) Patent No.: US 12,617,898 B2
(45) Date of Patent: May 5, 2026

(54) COMPOSITIONS AND COATINGS FOR UV-VIS AND IR TRANSPARENT THIN FILMS

(71) Applicant: The Boeing Company, Arlington, VA (US)

(72) Inventors: Andrew P. Nowak, Winnetka, CA (US); Erik Daniel Crenshaw, Los Angeles, CA (US); Marcos Pantoja, Saint Louis, MO (US); Jeffrey Daniel Britton, Webster Groves, MO (US)

(73) Assignee: THE BOEING COMPANY, Arlington, VA (US)

( * ) Notice: Subject to any disclaimer, the term of this patent is extended or adjusted under 35 U.S.C. 154(b) by 213 days.

(21) Appl. No.: 18/485,180

(22) Filed: Oct. 11, 2023

(65) Prior Publication Data

US 2025/0122341 A1 Apr. 17, 2025

(51) Int. Cl.

| | |
|---|---|
| ***C08G 75/00*** | (2006.01) |
| ***C08F 2/48*** | (2006.01) |
| ***C08G 75/045*** | (2016.01) |
| ***C08L 81/00*** | (2006.01) |
| ***C09D 181/02*** | (2006.01) |

(52) U.S. Cl.

CPC ......... *C08G 75/045* (2013.01); *C09D 181/02* (2013.01); *C08G 2150/00* (2013.01)

(58) Field of Classification Search

None

See application file for complete search history.

(56) References Cited

U.S. PATENT DOCUMENTS

| | | | |
|---|---|---|---|
| 9,670,379 | B2 | 6/2017 | Nowak et al. |
| 10,208,226 | B2 | 2/2019 | Nowak et al. |
| 10,414,870 | B2 | 9/2019 | Nowak et al. |

FOREIGN PATENT DOCUMENTS

WO WO-2012021793 A1 * 2/2012 ............. C08L 81/02

OTHER PUBLICATIONS

Extended European Search Report issued Jan. 30, 2025 in corresponding European Application No. 24193279.7, 6 pages.

* cited by examiner

*Primary Examiner* — Sheeba Ahmed

(74) *Attorney, Agent, or Firm* — MH2 Technology Law Group LLP

(57) ABSTRACT

Compositions and coatings for thin films designed to protect surfaces and windows from environmental abrasion (e.g., sand, dust, and rubbing) that are transparent in visual and infrared wavelengths are disclosed. The compositions comprise thiol-containing copolymers comprising: (1) 10-(3-butyl-2-hexyl-6-(9-mercaptononyl)cyclohexyl) decane-1-thiol; and (2) a multifunctional terminally unsaturated hydrocarbon monomer; wherein (1) and (2) are combined to form a UV curable crosslinked thermoset polymer network and no particulate fillers are added to the composition. The films exhibit a specular transmission of greater than 70% in the visual spectrum at about 400-700 nm, and IR wavelengths at about 4-5 μm, and about 7.5-12 μm when applied to a surface of a substrate in a coating thickness of about 1-500 μm. A method for making the films involving an UV initiated thiol-ene curing mechanism is also provided.

26 Claims, 7 Drawing Sheets
(3 of 7 Drawing Sheet(s) Filed in Color)

COMPOSITIONS AND COATINGS FOR UV-VIS AND IR TRANSPARENT THIN FILMS

TECHNICAL FIELD

The present disclosure generally relates to compositions, coatings, and methods for making thin films that are transmissive to radiation in the visual and the infrared wavelengths.

BACKGROUND

Progress in the field of autonomous vehicles has been maturing rapidly. A key to this technology is a diverse collection of sensors acquiring data across the visual, near IR (LIDAR) and radar bands of the spectrum. While the present state of the art is noteworthy, greater reliability and safety are continually being sought. To be truly reliable, the system should have the capability of detecting and classifying any object over a wide range of distances. The incorporation of thermal imaging into the sensor suite through the addition of a passive signal is being considered in sensor packages. Protection of such sensors is important to ensure reliable long-term performance under real world conditions. Imaging windows in infrared systems (3-15 μm) typically employ chalcogenides (ZnS, ZnSe), semiconductors (Ge), or oxides ($Al_2O_3$). These materials are characteristically brittle with their behavior demonstrating low fracture toughness. Consequently, they are susceptible to damage from high-speed rain or solid particles when these windows are exposed to the environment. As a result, there exists a need for affordable, easily manufactured, and installed visually and IR transparent films for the protection of materials susceptible to environmental damage.

SUMMARY

In accordance with one or more examples, the present disclosure provides a polymer composition comprising: a thiol-containing copolymer which comprises (1) f; and (2) at least one multifunctional terminally unsaturated hydrocarbon monomer. Components (1) and (2) are combined to form a UV curable crosslinked thermoset polymer network, and particulate fillers are not added to the composition. The compositions of the present disclosure exhibit a specular transmission of greater than 70% in a visual spectrum at about 400-700 nm, and IR wavelengths at about 4-5 μm, and about 7.5-12 μm when applied to a surface of a substrate in a coating thickness of about 1 to 500 μm.

In some examples, the at least one multifunctional terminally unsaturated hydrocarbon monomer can be 1,2,4-trivinylcyclohexane, or polybutadiene, and mixtures thereof. The polymer compositions may further comprise (3) at least one multifunctional thiol-terminated hydrocarbon monomer comprising a hydrocarbon interior. The multifunctional thiol-terminated hydrocarbon monomer may be 2-[2,4-bis(2-mercaptoethyl)cyclohexyl]ethanethiol, 1,3,5-tris(2-mercaptoethyl)cyclohexane, or α,ω-thiol-terminated hydrogenated polybutadiene, and mixtures thereof.

In an example, the thiol-containing copolymer of the present disclosure comprises 10-3-butyl-2-hexyl-6-(9-mercaptononyl)cyclohexyl)decane-1-thiol and 1,2,4-trivinylcyclohexane. In another example, the thiol-containing copolymer comprises 10-3-butyl-2-hexyl-6-(9-mercaptononyl) cyclohexyl)decane-1-thiol and 1,2,4-trivinylcylcohexane and polybutadiene. In yet another example, the thiol-containing copolymer comprises 10-3-butyl-2-hexyl-6-(9-mercaptononyl)cyclohexyl)decane-1-thiol, 2-[2,4-bis(2-mercaptoethyl)cyclohexyl]ethanethiol, 1,2,4-trivinylcyclohexane, and polybutadiene.

The present disclosure also provides a film comprising a polymer composition which comprises: a thiol-containing copolymer which comprises (1) 10-3-butyl-2-hexyl-6-(9-mercaptononyl)cyclohexyl)decane-1-thiol; and (2) at least one multifunctional terminally unsaturated hydrocarbon monomer. Components (1) and (2) are combined to form a UV curable crosslinked thermoset polymer network and particulate fillers are not added to the composition. The polymer composition is applied to a surface of a substrate and cured by UVC light or UV light to form a film. Films of the present disclosure exhibit a specular transmission of greater than 70% in a visual spectrum at about 400-700 nm, and IR wavelengths at about 4-5 μm, and about 7.5-12 μm when applied to a surface of a substrate in a coating thickness of about 1 to 500 μm. The films of the present disclosure may be further cured by exposure to electron beam radiation. In some examples, the polymer composition may be applied to the surface of the substrate and cured by UVC light or UV light without addition of an initiating agent. In other examples, the polymer composition applied to the surface of the substrate is cured by UVC light or UV light with the addition of a photoinitiator.

The present disclosure further provides a method for making a film comprising: providing a thiol-containing copolymer which comprises 10-3-butyl-2-hexyl-6-(9-mercaptononyl)cyclohexyl)decane-1-thiol; providing at least one multifunctional terminally unsaturated hydrocarbon monomer; dissolving the thiol-containing copolymer which comprises 10-3-butyl-2-hexyl-6-(9-mercaptononyl)cyclohexyl)decane-1-thiol and the at least one multifunctional terminally unsaturated hydrocarbon monomer in a solvent and forming a reaction mixture; depositing the reaction mixture onto a surface of a substrate to form a coating; and curing the coating with UVC light or UV light to form the film. In some examples, the thiol-containing copolymer further comprises a multifunctional thiol-terminated hydrocarbon monomer. In accordance with one or more examples, the thiol-containing copolymer further comprises a monofunctional thiol-terminated hydrocarbon monomer or a monofunctional thiol-terminated hydrocarbon monomer.

In accordance with one or more examples, the method of the present disclosure may further comprise, after forming a reaction mixture, partially reacting the thiol-containing copolymer and the at least one multifunctional terminally unsaturated hydrocarbon monomer in the reaction mixture by exposure to UVC light. In some examples, the method further comprises heating the film to volatilize unreacted monofunctional monomers, when employed.

The method may further comprise exposing the film to electron beam radiation. Curing the coating with UVC light or UV light, may include addition of a photoinitiator, or the coating may be cured without the addition of an initiating agent.

The compositions, films, and methods of the present disclosure may be employed to provide IR transparent windows having a thin film protective coating applied to the surface of the substrate.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various advantages of the embodiments will become apparent to one skilled in the art by reading the following specification and appended claims, and by referencing the following drawings in which:

Figure 1:
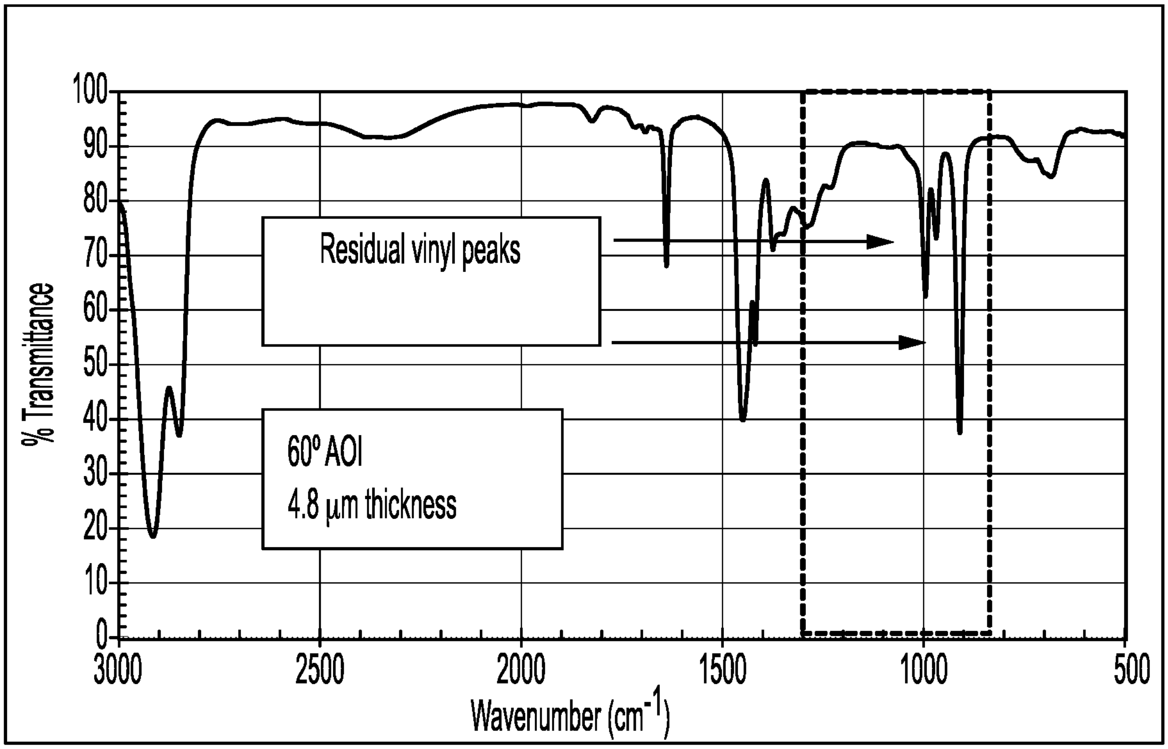
FIG. 1 is a graph illustrating a representative spectrum of a 4.8 μm thick film.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

Protective coatings for IR transparent windows are a natural defense, and a variety of specialized rigid materials including diamond, boron phosphide, and yttrium oxide have been explored. However, these inorganic coatings can be difficult and expensive to apply. Alternatively, organic polymer materials offer the potential for a damage tolerant protective layer but suffer characteristic absorptions of many common organic bonds in the fingerprint region (7-14 μm) of the infrared spectrum. Poly(ethylene) shows the highest infrared transparency compared to other organic polymer films but is limited by visual scattering due to crystallinity and low abrasion resistance. More amorphous hydrocarbons such as poly(propylene), poly(ethylene-co-propylene), and cyclic olefin copolymers display good visual transparency, but chemical inertness makes them difficult to bond onto surfaces and their thermoplastic nature is more susceptible to deformation from heat or fluid exposure in service.

Recently, crosslinked copolymer networks of elemental sulfur with unsaturated hydrocarbon monomers have demonstrated promising mid wave (3-5 μm) and long wave (7-14 μm) IR transparency. However, these polysulfide materials require processing at elevated temperatures producing a colored tint and rigid character complicating their use as protective window coatings. Other crosslinked copolymer networks of sulfur with unsaturated hydrocarbon monomers have been disclosed for use to make composites that are transmissive to visual and infrared radiation, which include nanoparticle fillers to boost IR transmission.

Common organic polymer coating systems such as urethanes, ureas, oxalamides, epoxies, acrylates, methacrylates, siloxanes, and fluoropolymers are challenged with respect to developing a long wave infrared (LWIR) transparent film due to multiple characteristic absorptions in the LWIR thermal band associated with these linkages. As a result, other chemical linkages are sought to create a curable polymer network with acceptable visible and LWIR transparency.

The present teachings provide compositions, coatings, and methods for forming a thin film designed to protect surfaces and windows from environmental abrasion (e.g., sand, dust, and rubbing) while also demonstrating visual and IR transparency across multiple bands. The composition of the present disclosure is a polymer composition that comprises a thiol-containing copolymer made from (1) a 10-3-butyl-2-hexyl-6-(9-mercaptononyl)cyclohexyl)decane-1-thiol hydrocarbon monomer, and (2) a multifunctional terminally unsaturated hydrocarbon monomer, which when combined form a curable thermosetting polymer network through a thiol-ene cure mechanism. With the exception of particulate fillers, the polymer composition may also optionally contain additives including but not limited to carrier solvents, initiating agents, pigments, dyes, antioxidants, and UV stabilizers.

In some examples, one or more of the following provisos apply to the compositions of the present disclosure. If the multifunctional terminally unsaturated hydrocarbon monomer is not a polymer having 12 carbon atoms or more, then the multifunctional thiol-terminated hydrocarbon monomer includes a saturated hydrocarbon ring with two or more terminal thiol groups attached to the hydrocarbon ring; and if the multifunctional terminally unsaturated hydrocarbon monomer is polybutadiene, the polybutadiene contains from about 0 mol % to about 30 mol % of polymer units in the cis-1,4-butadiene form.

For purposes of this disclosure, the term "thiol-containing" refers to a molecule that contains a thiol functional group which is composed of a sulfur atom and a hydrogen atom, i.e., a —SH group. The —SH functional group is referred to as either a thiol group or a sulfhydryl group. Thiols are also referred to as mercaptans. A "multifunctional thiol-terminated hydrocarbon" refers to an organic molecule comprising a hydrocarbon moiety, which comprises carbon and hydrogen atoms and which has two or more terminal thiol functional groups. The term "multifunctional" may also be interchanged with "polyfunctional".

The thiol-containing copolymers of the present disclosure exhibit the combined properties of high visual and IR transparency with rigid, environmentally durable mechanical properties and act as the matrix material of the present compositions. The visually transparent thiol-containing copolymers of the present disclosure demonstrate reduced absorption in both mid and long wave IR bands compared to many other engineering plastics. In addition, the copolymers employed as the polymeric matrix are thermosetting polymers, which form chemical bonds when cured, such as by UV exposure, and remain in a permanent solid state after being cured. Unlike thermoplastic polymers which can be remolded after curing, thermosetting polymers cannot be softened, melted, or remolded.

The thiol-containing copolymers of the present disclosure are made with 10-3-butyl-2-hexyl-6-(9-mercaptononyl)cyclohexyl) decane-1-thiol, which has the following formula (4):

(4)

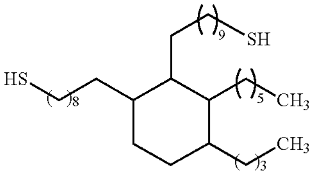

In some examples, the thiol-containing copolymers of the present disclosure additionally comprise a multifunctional thiol-terminated hydrocarbon monomer. The multifunctional thiol-terminated hydrocarbon monomers employed in making the thiol-containing copolymers can be substituted or unsubstituted, linear, branched, or cyclic $C_3$ to $C_{36}$ saturated hydrocarbons having two or more terminal thiol groups. Examples of suitable multifunctional thiol-terminated hydrocarbon monomers include at least one monomer chosen from the monomers of formulae (5) and (6):

(5)

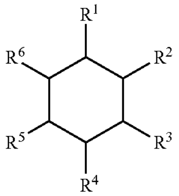

(6)

$HS—R^7—SH.$

With respect to formula (5): $R^1$, $R^2$, $R^3$, $R^4$, $R^5$, and Re are independently chosen from hydrogen,—SH, $C_1$ to $C_{10}$ alkyl, and —R'SH, where R' is a $C_1$ to $C_{10}$ hydrocarbon bridge, with the proviso that at least two of $R^1$, $R^2$, $R^3$, $R^4$, $R^5$, and $R^6$ are not hydrogen. In some examples, three or four of $R^1$, $R^2$, $R^3$, $R^4$, $R^5$, and $R^6$ are not hydrogen. In some other examples, R' is a $C_2$ to $C_4$ hydrocarbon bridge, such as an ethyl bridge. Specific examples of the monomers of formula (5) include 2-[2,4-bis(2-mercaptoethyl)cyclohexyl]ethanethiol) represented by formula (5a), 1,3,5, tris(2-mercaptoethyl)cyclohexane 1,3,5-tris(2-mercaptoethyl)cyclohexane represented by formula (5b), and 10-(2-heptyl-6-(8-mercaptooctyl)-3-pentylcyclohexyl) decane-1-thiol represented by formula (5c):

(5a)

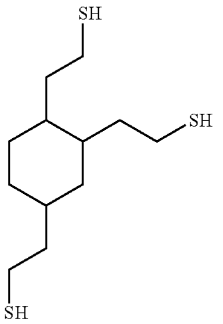

(5b)

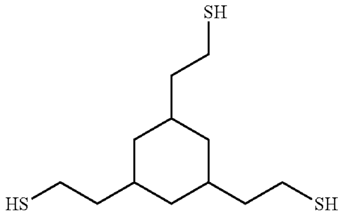

(5c)

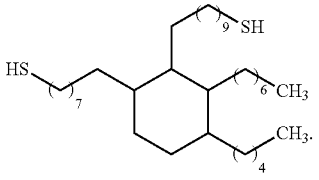

With respect to formula (6), $R^7$ is a $C_2$ to $C_{10}$ hydrocarbon bridge, such as a $C_4$ to $C_8$ hydrocarbon bridge. One example of a monomer of formula (5) is α,ω-thiol-terminated hydrogenated polybutadiene represented by formula (6a):

(6a)

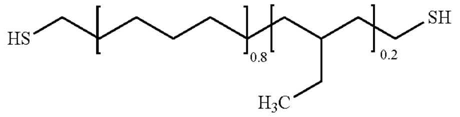

In some examples, α,ω-thiol-terminated hydrogenated polybutadiene has a weight average MW greater than 500 g/mol, greater than 1000 g/mol, greater than 2000 g/mol, or greater than 3000 g/mol. A molecular weight less than 500 g/mol is likely not to be polymeric. At a molecular weight higher than 3000 mol/g, IR transparency increases as the $CH_2$ content increases. In some examples, the α,ω-thiol-terminated hydrogenated polybutadiene has a thiol end group percentage of greater than 70%, greater than 80%, greater than 90%, or greater than 95%. A higher thiol end group percentage, or fidelity, the better a difunctional species will react in forming the network. If there is a significant fraction of only monomeric thiol species, the monomeric thiols will act as chain termination points and lower cross-linking information of the network.

In some examples, the multifunctional thiol-terminated hydrocarbon monomers comprise a saturated hydrocarbon interior relative to the reactive thiol functional groups. The term "interior" refers to all but the terminal atom positions and the bonds attaching the terminal atoms to the monomer. For example, the interior hydrocarbon moieties of the multifunctional thiol-terminated monomers of formulas (4) and (5) of the present disclosure contain only saturated hydrocarbon groups.

For purposes of this disclosure, the term "unsaturated hydrocarbon monomer" refers to an organic molecule made up entirely of carbon and hydrogen atoms and which contains a double or triple covalent bond functional group. A "multifunctional terminally unsaturated hydrocarbon monomer" refers to a hydrocarbon unsaturated compound that has two or more terminal double (e.g., alkenes including allyl ($CH_2$═CH—$CH_2$—R), and vinyl (R—CH═$CH_2$) groups, etc.) and/or triple bond (e.g., alkyne ($CH_2$═C—R)) functional groups. Examples of suitable multifunctional terminally unsaturated hydrocarbon monomers for making the copolymers of the present disclosure include but are not limited to substituted or unsubstituted, linear, branched, or cyclic $C_3$ to $C_{36}$ hydrocarbons that are internally saturated and have two or more terminal vinyl or alkynyl groups. For example, the multifunctional terminally unsaturated hydrocarbon monomer can be a compound of formulae of (7), (8), (9), or (10):

(7)

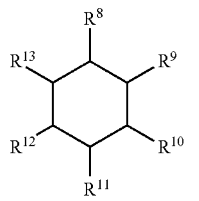

(8)

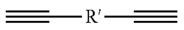

(9)

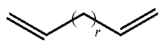

(10)

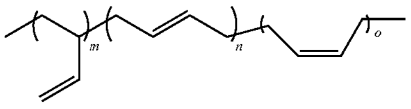

where:

$R^8$, $R^9$, $R^{10}$, $R^{11}$, $R^{12}$, and $R^{13}$ are independently chosen from hydrogen and alkenyl substituents having a terminal vinyl group, where at least two of $R^8$, $R^9$, $R^{10}$, $R^{11}$, $R^{12}$, and $R^{13}$ are not hydrogen;

R' is a $C_2$ to $C_{10}$ hydrocarbon bridge, a $C_4$ to $C_8$, or a $C_5$ to $C_7$;

r is an integer ranging from 1 to 10, 2-8, or 4-6;

m ranges from about 70 mol % to about 90 mol %, 75 mol % to about 85 mol %, or about 80 mol %;

n is 0 mol % to about 30 mol %, 5 mol % to about 25 mol %, or 10 mol % to about 20 mol %;

o is 0 mol % to about 30 mol %, 5 mol % to about 25 mol %, or 10 mol % to about 20 mol %; and n+o is about 10 mol % to about 30 mol %, 5 mol % to about 25 mol %, or 10 mol % to about 20 mol %.

Because the "m" repeating units are highly reactive, it is desirable to have a higher m mol % as compared to "n" and "o". The "n" and "o" repeating units are not reactive and contribute to undesirable absorption peaks.

In some examples of the present disclosure the multifunctional terminally unsaturated hydrocarbon monomer is polybutadiene, trivinylcyclohexane, and/or mixtures thereof.

Formula (10) above shows a polybutadiene as one example of a terminally unsaturated hydrocarbon monomer. In an example, the weight average molecular weight of the polybutadiene polymers of formula (10) can range from about 1400 to about 5200 g/mol, from about 2300 to about 4300 g/mol, or from about 3000 to about 4000. As can be seen from the values of "m", "n" and "o", the polybutadiene contains from about 0 mol % to about 30 mol %, 5 mol % to about 25 mol %, or 10 mol % to about 20 mol % of polymer units in the trans-1,4-butadiene form (as indicated by 'n') and about 0 mol % to about 30 mol %, 5 mol % to about 25 mol %, or 10 mol % to about 20 mol % of polymer units in the cis-1,4-butadiene form (as indicated by "o"). The polybutadiene contains a majority of units that result in a terminal vinyl branch group on the polymer (about 70 mol % to about 90 mol %, 75 mol % to about 85 mol %, or about 80 mol %).

In some examples, the interior of the precursor materials, such as the interior of any of the terminally unsaturated hydrocarbon monomers of formulae (7), (8), or (9) discussed above, and/or the hydrocarbon moieties of the thiol-terminated hydrocarbon monomers, contain only saturated hydrocarbon species. This can help ensure that the entire polymeric backbone produces the desired IR transparency. The term "interior" here refers to all but terminal atom positions and the bonds attaching the terminal atoms to the monomer. Combining a multifunctional thiol-terminated monomer having a saturated hydrocarbon interior with a multifunctional terminally unsaturated hydrocarbon monomer of the present disclosure produces a UV-curable crosslinked thermoset network with greater hydrocarbon content and higher IR transparency due to the saturated hydrocarbon character of the interior backbone.

The copolymer of the compositions of the present disclosure may optionally include a monofunctional thiol-terminated hydrocarbon monomer or a monofunctional terminally unsaturated hydrocarbon monomer. The term, "monofunctional thiol-terminated hydrocarbon monomer," refers to a molecule having only one thiol functional group. Suitable monofunctional thiol-terminated hydrocarbon monomers include but are not limited to $C_2$ to $C_{36}$ linear aliphatic hydrocarbons having only one terminal thiol functional group. In some examples of the present disclosure, 1-dodecanethiol represented by formula (11) is employed as the monofunctional thiol-terminated hydrocarbon monomer.

(11)

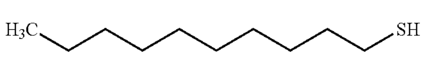

The term, "monofunctional unsaturated hydrocarbon monomer," refers to a hydrocarbon moiety having only one double (e.g., alkenes including allyl ($CH_2$═CH—$CH_2$—R), and vinyl (R—CH═$CH_2$) groups, etc.) or only one triple bond functional group (e.g., alkyne ($CH_2$≡C—R).

When making the copolymers of the present disclosure, as discussed in the provisos above, if the terminally unsaturated hydrocarbon monomer is a polymer having 12 carbon atoms or less, such as would be the case for formulae (7) to (9), then the thiol-terminated hydrocarbon monomer includes a saturated hydrocarbon ring with two or more terminal thiol groups attached to the hydrocarbon ring, such as the compounds of formula (5) above. Alternatively, if the terminally unsaturated hydrocarbon monomer that is a polymer having 12 carbon atoms or more, such as would be the case for the compounds of formula (10), then any of the thiol-terminated hydrocarbon monomers disclosed herein, such as those of formulae (5) and (6), can be used.

The thiol-containing copolymers of the present disclosure can be made by combining a 10-(3-butyl-2-hexyl-6-(9-mercaptononyl)cyclohexyl)decane-1-thiol monomer and optionally at least one multifunctional thiol-terminated hydrocarbon monomers with at least one terminally unsaturated hydrocarbon monomer. When employed with 10-(3-butyl-2-hexyl-6-(9-mercaptononyl)cyclohexyl)decane-1-thiol, any of the thiol-terminated hydrocarbon monomers, and any of the terminally unsaturated hydrocarbon monomers disclosed herein can be employed as reactants to form the thiol-containing copolymers. In some examples, at least one monofunctional thiol-terminated hydrocarbon monomer or terminally unsaturated hydrocarbon monomer may further be optionally added to the composition. The molar ratio of the reactive groups of thiol to the terminally unsaturated species is ideally 1 to 1. Molar ratios of thiol to the terminally unsaturated species can range from 0.75 to 1, 1.25 to 1. When at least one monofunctional thiol-terminated hydrocarbon monomer or terminally unsaturated monomer is optionally employed, the molar ratio of the multifunctional thiol-terminated monomer to the multifunctional terminally unsaturated monomer is between 1 to 2 and 2 to 1. In some examples, the molar ratio of the multifunctional terminally unsaturated hydrocarbon monomer to the monofunctional thiol-terminated monomer or the monofunctional terminally unsaturated hydrocarbon monomer is between 1 to 1 and 1 to 5. In other examples, the ratio of the multifunctional terminally unsaturated hydrocarbon monomer to the monofunctional thiol-terminated monomer or the monofunctional terminally unsaturated hydrocarbon monomer is between 1 to 1 or between 1 to 3. In some examples, the molar ratio of the multifunctional thiol monomer to the multifunctional terminally unsaturated monomer is about 1 to 1 with respect to desired absorption properties. It is desirable for the terminal thiol functional groups of the multifunctional thiol copolymer to react with all of the terminal unsaturated functional groups of the multifunctional terminally unsaturated monomer because unreacted species contribute to absorption.

With the exception of particulate fillers, the compositions including the copolymers of the present disclosure may optionally include additives which include but are not limited to solvents, initiating agents, pigments, dyes, antioxidants, and UV stabilizers, as long as they do not significantly detrimentally alter or affect the transparency in the UV and IR bands of the coatings or films formed from the compositions.

In some examples, the compositions of the present disclosure include a solvent. The purpose of the solvent is to solubilize the copolymer matrix. Due to the immiscibility of the multifunctional thiol-terminated hydrocarbon monomer and the multifunctional terminally unsaturated monomer in a neat form, a solvent diluent is used to disperse the monomers and create a single-phase system. Any suitable solvent can be employed. Examples of suitable solvents include but are not limited to xylenes, toluene, cyclohexane, and mixtures thereof. Solids concentration in the wet compositions of the present disclosure can range from about 5% by weight to about 50% by weight, from about 10% to about 40% by weight, or from about 20% to about 30% by weight, with the solvent concentration ranging from about 50% by weight to about 95% by weight, from about 60% to about 90% by weight or from about 70% to about 80% by weight, relative to the total weight of the composition. The composition comprising a solvent as described herein can be mixed and/or stored in a liquid form. The liquid composition can be deposited and dried to form a solid coating, or layer. The dried coating, or layer, includes the copolymer matrix. The coating, or layer, is transparent at one or more visual wavelengths in the 400-700 nm region, and transparent at one or more infrared wavelengths in the 4-5 μm and 7.5-12 μm region. Upon solvent removal and before curing, however, the system has the potential to microphase separate and create a hazy diffusely scattering surface. To avoid this, the mixture can be partially reacted together before full curing through exposure to low intensity ultraviolet-C light (UVC), ultraviolet light of a specific wavelength in the range of 200-300 nm. This suppresses the tendency to separate and creates a visually clear, homogeneous film upon solvent removal.

Color can be added to the coatings and films of the present disclosure using pigments or dyes. Suitable pigments include but are not limited to $MNO_2$, $Fe_3O_4$, and carbon black. In some examples, an organic dye such as Sudan Black is used because it provides improved homogeneity as compared to dispersed inorganic pigments. Additionally, UV stabilizers and antioxidants can be added to improve environmental durability. Suitable UV stabilizers include but are not limited to hindered amine light stabilizers, such as TINUVIN 123® (BASF), triazine absorbers, such as TINUVIN 400® (BASF), and benzotriazole absorbers such as TINUVIN 571® (BASF). Suitable antioxidants include but are not limited to phosphite antioxidants, such as BENOFOS 1618® (Mayzo) and high molecular weight hindered phenolic antioxidants, such as BNX 1010® (Mayzo).

The compositions of the present disclosure are transparent to radiation in both the visible (VIS) and infrared (IR) spectrums without the addition of particulate fillers. In some examples, the composition of the present disclosure exhibits a specular transmission of greater than 70% in the visual spectrum at about 400-700 nm, and at IR wavelengths at about 4-5 μm, and about 7.5-12 μm when applied to a substrate surface at about 1 to 500 μm thickness. In some other examples, the compositions of the present disclosure achieve greater than 80% transparency, or greater than 90% transparency, and in some examples, the compositions of the present disclosure achieve greater than 95% transparency in the visual spectrum at about 400-700 nm, as well as at IR wavelengths at about 4-5 μm, and about 7.5-12 μm when applied to a substrate surface at about 1 to 500 μm thickness. The thickness of the film may preferably be within the range of 5 to 20 μm, or within the range of 5 to 10 μm.

The compositions of the present disclosure may be applied to a substrate to form thin films designed to protect surfaces and windows from environmental abrasion (e.g., sand, dust, and rubbing). Suitable substrates can be made from a material that is transparent such as glass or polycarbonate. Alternatively, the substrate can be made of a material that is not transparent, including aerospace surfaces, such as metal (e.g., aluminum), and carbon fiber composites.

It is desirable to keep bond structures that absorb radiation in the visual spectrum or in the IR wavelength ranges of about 4 to about 12 microns at sufficiently low concentrations to maintain a desired level of transparency, since increasing the density of these absorptive bonds in the polymer will begin to progressively absorb more and more light and thereby reduce transparency. Examples of unwanted moieties that contain light absorbing bond structures include esters, carboxylic groups, carbonyl groups, ketones, ethers, carbon-halogen bonds, and aromatic species. The amounts of these groups that can be included in the materials without undesirably effecting transparency may vary depending on the radiation absorbing properties of each of the groups. In an example, the copolymers of the present disclosure contain none, or substantially none, of any one of esters, carboxylic groups, carbonyl groups, ketones, ethers, carbon-halogen bonds, aromatic moieties, or thiosulfonato groups. The precise amounts of any residual concentrations of these moieties in the copolymers of the present disclosure may be difficult to determine. Thus, the term "substantially none" is defined herein to mean that the monomer reactants are chosen to avoid the formation of these unwanted moieties (e.g., that any such moieties that are formed do so because of chemical impurities in the reactants and/or unwanted side reactions and so forth).

The copolymers of the present disclosure can be relatively large molecules, such as macromolecules. These molecules are crosslinked to the point that they create a thermoset polymer network that effectively is crosslinked to the point that the entire macroscopic piece is a single molecule. Crosslinking results from covalent bonds between adjacent monomers or polymer chains. Further, the molecular weight of a single copolymer and/or the number of copolymers contained in an amount of bulk polymeric material formed by the processes of the present disclosure can be difficult or impossible to determine. The term "bulk polymeric material" is defined to mean, for purposes of this disclosure, a polymeric product made by the processes of the present disclosure that has been dried to remove any solvents.

In an example, the monomer reactants used to make the copolymers of the present disclosure are limited to only those disclosed herein. For example, the thiol-terminated hydrocarbon monomer, and the terminally unsaturated hydrocarbon monomer, and the monofunctional thiol-terminated hydrocarbon monomer or monofunctional unsaturated hydrocarbon monomer when optionally included, are the only monomers reacted to form the copolymers of the present disclosure, except for any residual monomer impurities introduced with the reactants. One technique for achieving the desired transparency is to employ monomers with a high degree of purity to reduce unwanted light absorbing bond structures. In an example, each of the monomer reactants have a purity of 95 weight % or more, such as 97 weight % or more, or 98 weight % or more.

The copolymers of the present disclosure are amorphous (e.g., having little or no crystallinity), which increases visual transparency. The low crystallinity is a result of the polymer units being arranged randomly in the copolymer structure. Also, as mentioned above, for purposes of IR transparency the thiol-containing copolymer product can be saturated. Alternatively, the thiol-containing copolymers can include some internal unsaturation, such as where polybutadiene polymers discussed above are used as the multifunctional terminally unsaturated hydrocarbon monomer.

The copolymers of the present disclosure do not include monomers that are not visually transmissive. For example, polyethylene is highly transmissive in the IR band but because of crystallization and inhomogeneity in the index of refraction at the μm scale scatters visible light to be translucent. Additionally, the copolymers of the present disclosure do not include significant amounts of silicone-based materials, polymers, or other compounds that are not transparent to IR, such as polycarbonate, polystyrene, Teflon, polyethylene, and polypropylene. The term "significant amounts" as used herein is defined to mean 1% by weight or more (e.g., 1% to 100% by weight). In some examples, the copolymers of the present disclosure can contain less than 0.5% by weight or 0.01% by weight or less (e.g., 0.5% to 0% by weight), such as none, of the materials listed in this paragraph.

Polymerization can be carried out with either free radical UV initiators or through high intensity UV light alone. Thus, the reaction process can include exposing the reaction mixture to ultraviolet light. An example of the general reaction can be illustrated as follows:

$$A+B \xrightarrow{\text{UV Photoinitiator}} A'_xB'_y$$

where "A" is any of the thiol-terminated hydrocarbon monomers disclosed herein; "B" is any of the terminally unsaturated hydrocarbon monomers disclosed herein; A' and B', are the corresponding polymer units respectively formed from monomers A, and B during the polymeric reaction; and the values for x and y each range from about 0.3 to about 0.7, where x+y=1.

The present inventors have developed a thiol-ene system. The polymer composition of the present disclosure forms a curable thermoset polymer network created from the coupling of thiol and a terminally unsaturated copolymer through a thiol-ene cure mechanism. These thiol-containing copolymers include thiol-enes produced by the reaction of thiols and terminally unsaturated hydrocarbon functional groups. By "ene" it is meant a copolymer that contains at least one functional group composed of an unsaturation that is a double bond or a triple bond between two carbon atoms. This functional group is referred to as an -ene group. "Thiol-enes" is the expression for a mixture of thiol and unsaturated monomers including the cured product of the mixture.

Coupling of the multifunctional thiol-terminated hydrocarbon monomer, the multifunctional terminally unsaturated hydrocarbon monomer, and the monofunctional thiol-terminated hydrocarbon monomer or terminally unsaturated hydrocarbon monomer as in the compositions of the present disclosure creates the thiol-ene system of the present disclosure, which contributes to the exceptional properties of the compositions, coatings, and films of the present disclosure to achieve greater than 70%, greater than 80%, greater than 90%, or greater than 95% transparency in both the visual (400-700 nm) and IR bands (4-5 μm and 7.5-12 μm). The C—S linkages of the copolymers of the present disclosure which are formed upon polymerization do not display significant absorption bands in ranges of interest to common IR cameras. The symmetry of the —C—S—C— linkage and the heavy mass of S with respect to carbon shift absorptions are characteristic of organic polymer films outside of the LWIR thermal window. Polymeric materials can be a crosslinked polymer network.

No other components are added to the compositions of the present disclosure except for the disclosed monomers including multifunctional thiol-terminated hydrocarbon monomers, multifunctional terminally unsaturated hydrocarbon monomers, and monofunctional thiol-terminated hydrocarbon monomers or monofunctional terminally unsaturated hydrocarbon monomers; and optional additives including solvents, initiating agents, pigments, dyes, antioxidants, and UV stabilizers as described herein.

In other examples, in particular no particulate fillers are added to the compositions of the present disclosure. Particulate fillers which exhibit high IR transparency have been employed in compositions transmissive to visual and infrared radiation to reduce scattering in both IR and visible wavelength ranges and increase IR transparency. However, the films from the compositions of the present disclosure achieve a wide breadth of greater than 70-95% transparency across the majority of both visual bands (400-700 nm) and IR bands (4-5 μm and 8-12 μm) without the addition of particulate fillers. This is a remarkable and unexpected effect since organic polymers typically have characteristic absorptions concentrated in the IR regions in the fingerprint region of 8-12 μm.

In another example, thermal or UV initiators such as benzoyl peroxide and azobisisobutyronitrile, are not added to the compositions of the present disclosure. The films of the present disclosure are comprised of thiol-containing copolymers that comprise (1) 10-(3-butyl-2-hexyl-6-(9-mercaptononyl)cyclohexyl)decane-1-thiol, and (2) a multifunctional terminally unsaturated hydrocarbon monomer; wherein (1) and (2) are combined to form a UV curable crosslinked thermoset polymer network through a UV-initiated thiol-ene cure mechanism. In some examples, Optional carrier solvent, initiating copolymers, pigments, dyes, antioxidants, and UV stabilizers can also be added.

The films of the present disclosure are applied to a surface of a substrate and cured to form a thin film. The films can be applied to the substrate by known deposition methods, which include, but are not limited to spin casting, spray coating, and dip coating. In some examples, the substrate on which the compositions are deposited may be treated with a thiol or unsaturated silane compound prior to deposition of the coating, to improve adhesion to the surface. UVC or UV light is used to cure the compositions coated on the substrate. In some examples, the UVC light employed for curing has an average wavelength of 280 nm or lower or more preferably, an average wavelength of about 250 nm. In some examples, the film may additionally be cured by exposure to electron beam radiation to promote carbon to carbon (C—C) linkages and to cure the films more fully.

The films of the present disclosure can be cured with UVC light or UV light with or without the addition of an initiating agent. As previously discussed, the compositions of the present disclosure include thiol-ene systems produced by the reaction of multifunctional thiol-terminated hydrocarbon monomers and multifunctional terminally unsaturated hydrocarbon monomers to produce a curable thermosetting polymer network. The thiol-ene systems are typically cured through a radical mechanism, and therefore can be cured through either heat with thermal initiators or light with photoinitiators. However, in some examples of the present disclosure, the multifunctional thiol-terminated hydrocarbon monomers and multifunctional terminally unsaturated hydrocarbon monomers can be cured with high intensity UV light, e.g., a UVC (254 nm) high intensity lamp, to generate a radical species without the need for thermal or UV initiators. The compositions without thermal or UV initiators have improved IR transparency as compared to a similar composition with thermal or UV initiators.

In some examples, the film may also be heated to volatilize unreacted monofunctional thiol-terminated hydrocarbon monomers or monofunctional terminally unsaturated hydrocarbon monomers (i.e., alkenyls, such as allyl or vinyl functional groups, and alkynyls such as an ethyne group) when optionally employed. For example, as can be seen in FIG. 1, the 2-[2,4-bis(2-mercaptoethyl)cyclohexyl]ethanethiol (TMC)+polydutadiene composition at a weight ratio of 3/5 respectively has an excess of vinyl groups which appear as narrow characteristic absorptions in the 8-12 μm window, i.e., the fingerprint region. The monofunctional thiol-terminated hydrocarbon monomers having a saturated hydrocarbon interior added into the formulation react with the excess vinyl groups and reduce their characteristic absorption peaks. Suitable monofunctional thiol-terminated hydrocarbon monomers include but are not limited to linear aliphatic $C_2$ to $C_{36}$ thiol-terminated hydrocarbon monomers. In an example, 1-dodecanethiol is employed as the monofunctional thiol-terminated hydrocarbon monomer.

The films of the present disclosure exhibit a breadth of transparency in the visual (400-700 nm) and IR bands (4-5 μm and 7.5-12 μm) of greater than 70% at a thickness of about 10 μm. At 5 μm thickness these films achieve >80-95% transparency across the majority of the previously mention visual and IR bands. This property is exceptional due to characteristic absorptions in organic polymer films being concentrated in the IR regions of the 8-12 μm window known as the ‘fingerprint region’.

Methods for making thin films of the present disclosure include providing a multifunctional thiol-terminated hydrocarbon monomer, providing a multifunctional terminally unsaturated hydrocarbon monomer, and dissolving the multifunctional thiol-terminated hydrocarbon monomer and the multifunctional terminally unsaturated hydrocarbon monomer in a solvent to form a reaction mixture. In an example, the thiol-containing copolymer comprises an α,ω-thiol-terminated hydrogenated polybutadiene monomer, and a polybutadiene monomer. The reaction mixture is deposited onto a surface of a substrate to form a coating and the coating is cured with UVC light or UV light to form the film.

Figure 2A:
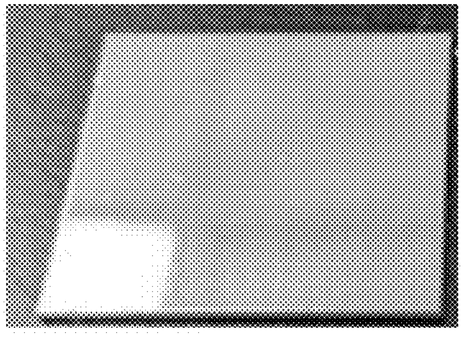
FIGS. 2A and 2B are images of a clear cured film on a polished aluminum substrate after precuring (2A) and a hazy film on a polished aluminum substrate formed without precuring.
Figure 2B:
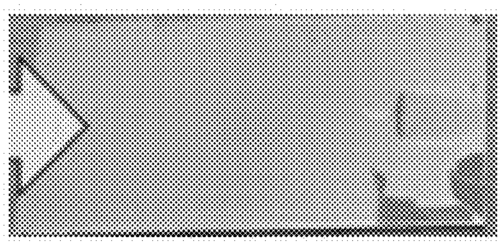

In some examples, a monofunctional thiol-terminated hydrocarbon monomer or a monofunctional terminally unsaturated hydrocarbon monomer may optionally be provided and added to the reaction mixture to form a thiol-containing copolymer. When a monofunctional thiol-terminated hydrocarbon monomer or a monofunctional terminally unsaturated hydrocarbon monomer is employed, after dissolving the multifunctional thiol-terminated hydrocarbon monomer and the multifunctional terminally unsaturated hydrocarbon monomer in a solvent and forming a reaction mixture, and prior to adding the monofunctional thiol-terminated hydrocarbon monomer or the monofunctional terminally unsaturated hydrocarbon monomer, the multifunctional thiol-terminated hydrocarbon monomer and the multifunctional terminally unsaturated hydrocarbon monomer in the reaction mixture can be partially reacted by exposure to UVC light. Partially reacting the reaction mixture suppresses the tendency for the system to microphase separate and allows for a visually clear, homogeneous film to be formed upon solvent removal. FIG. 2A is an example of a clear cured film of the present disclosure on a polished aluminum substrate wherein the multifunctional thiol-terminated hydrocarbon monomer and the multifunctional terminally unsaturated hydrocarbon monomer in the reaction mixture were partially reacted before curing. FIG. 2B is an example of a film on a polished aluminum substrate wherein the multifunctional thiol-terminated hydrocarbon monomer and the multifunctional terminally unsaturated hydrocarbon monomer in the reaction mixture were not partially reacted prior to curing. As can be seen by comparison, the film of FIG. 2A is a visually clear, homogeneous film, whereas the film of FIG. 2B has a hazy diffusely scattering surface due to immiscibility and microphase separation.

The methods for making the thin films of the present disclosure can also involve heating the film after curing the film with UVC or UV light to volatilize unreacted monofunctional monomers. As previously mentioned, the combination of multifunctional thiol-terminated hydrocarbon monomers and multifunctional terminally unsaturated monomers can lead to an excess of vinyl groups which typically have characteristic absorptions concentrated in the IR regions in the fingerprint region of 8-12 μm. The films of the present disclosure which include 10-(3-butyl-2-hexyl-6-(9-mercaptononyl)cyclohexyl)decane-1-thiol monomer have reduced characteristic vinyl peaks as compared to FIG. 1. due to improved consumption of terminal vinyls. The films of the present disclosure may further be exposed to electron beam radiation to promote carbon to carbon (C—C) linkages, and to cure the film more fully.

In some examples of the present disclosure, curing the coating applied to the substrate surface with UVC light or UV light includes the addition of a photoinitiator. Thiol-ene systems as in the present disclosure can be cured through either heat with thermal initiators or light with photoinitiators through a radical mechanism. An example of a suitable photoinitiators is 2,2-dimethoxy-2-phenylacetophenone (DMPA). In other examples, curing the coating applied to the substrate surface with UVC light or UV light is without the addition of an initiating agent. When the wavelength of the UVC or UV light is in a predetermined range sufficient to generate radical species, thereby eliminating the need for photoinitiators and improving IR transparency.

In the method of the present disclosure, the reaction mixture can be deposited onto the surface of the substrate by methods including but not limited to spin casting, spray coating, and dip coating. In some examples, the surface of the substrate can be silane treated with a thiol or an unsaturated silane. The method of the present disclosure may be carried out using a conveyor belt or a roll-to-roll process.

The compositions, films, and methods of the present disclosure can be used to make a transparent composite article or product using the compositions of the present disclosure. Transparent composites of the present disclosure can be made by depositing the composition on a surface of a substrate to form a layer, wherein the composition comprises a thiol-containing copolymer, which comprises a multifunctional thiol-terminated hydrocarbon monomer, a multifunctional terminally unsaturated hydrocarbon monomer, and wherein no particulate fillers are added to the composition. The substrate can be made from a transparent material, such as a polycarbonate, or glass. Alternatively, the substrate can be made from a material that is not transparent. Any suitable technique can be used to deposit the composition forming a layer on the substrate. For example, the deposition can be performed by either spray coating, casting, or dip coating. Other liquid deposition techniques can also be employed.

The dried composites of the present disclosure, such as the windows, of the present disclosure do not include any other components except for: a thiol-containing copolymer matrix as formed by reaction of the disclosed monomers (1), (2), and optionally (3) described above, and any non-reacted monomers and/or unintended residual products formed by reaction of the monomers as described herein. Alternatively, the compositions and composites can include one or more additional ingredients other than those described herein, where the additional ingredients do not substantially affect the desired visual and/or IR transparency of the resulting films.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Example 1. Synthesis of PBD-TMC 5/3

Ricon 154 (20 g, Cray Valley), a high vinyl homopolymer of polybutadiene, was dissolved in xylenes (18 g) in a centrifugal mixer cup and left overnight. The mixture was mixed in a Flaktek 600 (2 min, 2000 rpm) to ensure homogeneity. TMC 2-[2,4-bis(2-mercaptoethyl)cyclohexyl]ethanethiol (12 g, synthesized previously) was then added and mixed again in the centrifugal mixer. The mixture was aged using a UVC lamp (254 nm UV UVC 25 W) placed ~2" above the cup lip by turning on the lamp while a stir bar aggressively mixed the solution. The stirring and lamp were occasionally stopped to remove the thin film of material cured on the surface. After 20 cumulative minutes of aging the solution was covered in foil to protect it from light and stored on a shelf.

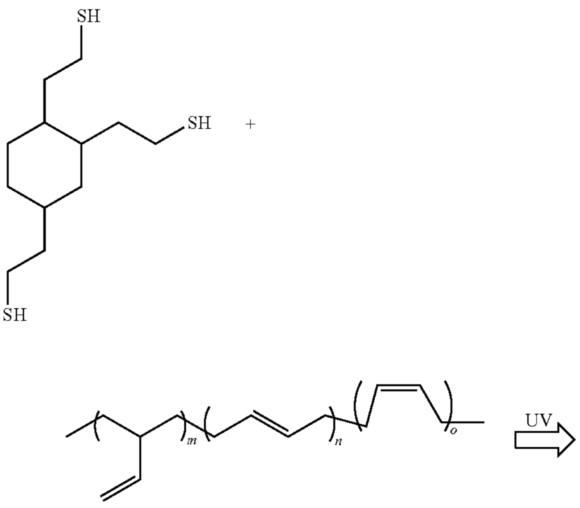

Polished Al plates (1/32" thickness, McMaster Carr) that had previously been treated with a vinyl silane species to act as an adhesion promoter were cut to 3"×3" coupons and placed on a spin coater (MTI Corp VTC-100). A 2 mL aliquot was placed in the center of the instrument spun for 30 seconds at 3000 rpm. This typically produced a coating thickness of about 10 μm. For thinner films the earlier mixture was diluted with additional xylenes by adding 0.23 g xylenes to 1.00 g of the mixture to produce films having a coating thickness of about 5 μm.

Example 2. Synthesis of PBD-TMC 5/3+7 Dodecanethiol 7 equivalents by weight of 1,12-dodecanethiol were added to the aged PBD+TMC 2-[2,4-bis(2-mercaptoethyl)cyclohexyl] ethanethiol mixture from Example 1. The solution was mixed to homogenize it and applied to polished Al plates by spin coating deposition methods as described in Example 1. In some samples the mixture was cured with a 25 Watt UVC lamp for 30-60 seconds to partially cure the film and prevent dewetting.

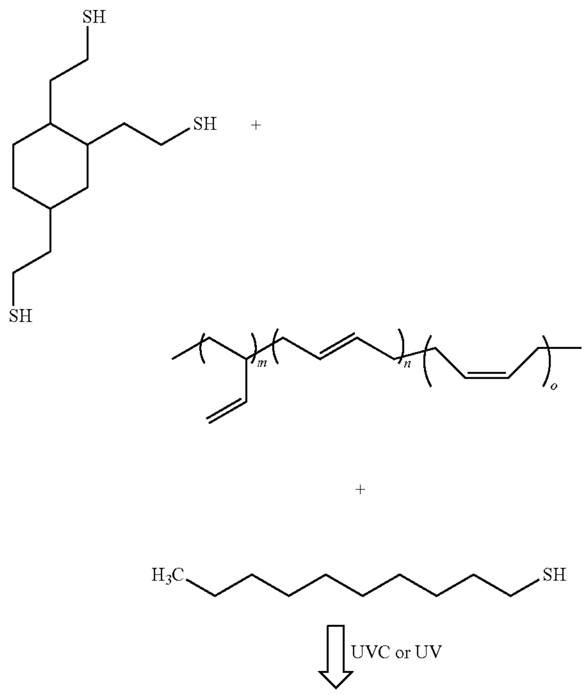

Example 3. Single Bounce Transmission Measurement

A Fourier transform infrared spectrometer (Thermofisher, Nicolet is 50 FTIR) was fitted with a single bounce transmission apparatus (Harrick Scientific, Seagull). A background spectrum was collected off a 1"×1" uncoated polished aluminum substrate in atmospheric conditions as a reference at 100% transmission (T). Samples were measured from 8000 to 400 cm-1 and ensemble averaged over 16 scans. Samples and background were measured with angles of incidence of: 5°, 30°, and 60° from the normal angle.

Example 4. Abrasion Measurement

Figure 3:
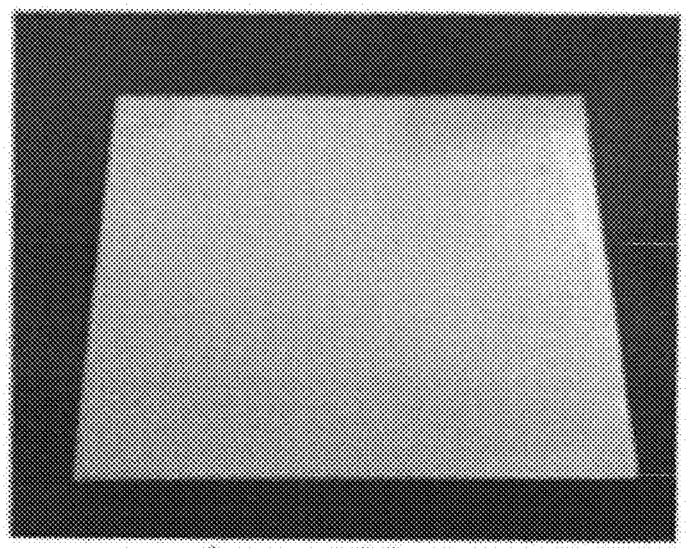
FIG. 3 is an image of film on an aluminum substrate after abrasion testing.

Cured samples were affixed to the upper register of a Martindale Abrasion & Pilling Tester (James Heal, Martindale 1600 902-966) fitted with a 500 gram, 9 kPa pressure fixture. The lower register was fitted with Nature's Fabrics off-white bamboo velour fabric. A smooth buffing cloth was used as the contacting surface at 9 kPa normal pressure intended to simulate cleaning of the surface. The instrument was run for 6,000 cycles in a Lissajous pattern, stopping periodically to analyze by single bounce transmission measurement. FIG. 3 is an image of the cured sample after the abrasion testing. There was no decrease in 8-12 μm LWIR transmission or visible surface damage following the 6000 rub cycles.

Example 5. Particle Erosion

A microbead blaster (Comco Inc) was charged with 35 μm $SiO_2$ spheres (Comco) and a polished Al coupon (1.5"×1.5") loaded in a jig designed to hold the wand nozzle at a fixed distance (4") from the surface of the coupon with stream incident perpendicular to the surface. Pressure was set between 40-80 psi and the stream engaged for a fixed period of time (typically 10-60 secs). The coupons were then washed of residual particulates and measured using the single bounce transmission measurement.

Example 6. Measurement of Film Transmission

Measurement of transmission through the films was made using a single bounce reflection apparatus. A representative spectra of a ~5 μm thick film is shown with the 7.5-12 μm region highlighted in green. As can be seen in FIG. 1, with the TMC 2-[2,4-bis(2-mercaptoethyl)cyclohexyl]ethanethiol+polybutadiene composition at a weight ratio of 3/5 respectively there is an excess of vinyl groups which appear as narrow characteristic absorptions in the 7.5-12 μm window.

Example 7. Abrasion and Corrosion Protection

Figure 4:
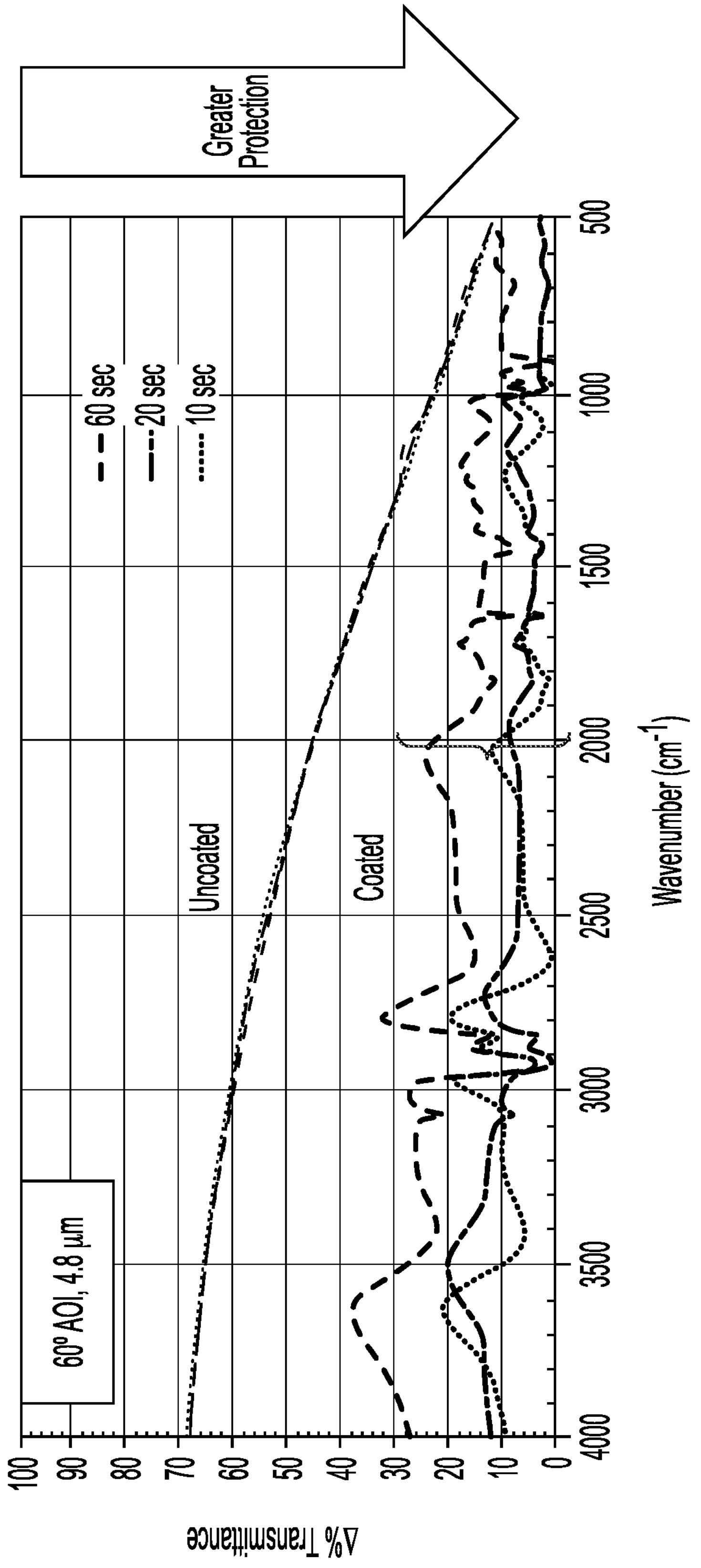
FIG. 4 is a graph illustrating the Δ% transmission measured before and after exposure to 35 mm $SiO_2$ particles at 40 psi at exposure times of 10, 20, and 60 seconds.
Figure 5:
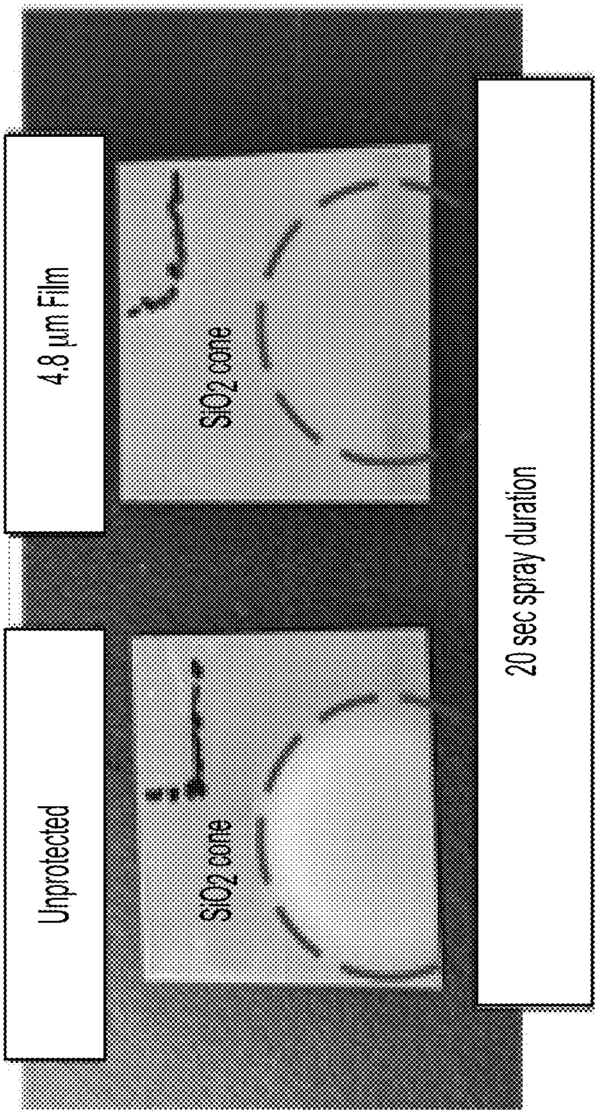
FIG. 5 is an image showing a comparison of uncoated and coated samples exposed to an identical 20 seconds of 35 mm $SiO_2$ spray.

Using these visually and IR transparent films as a surface protective coating from adverse elements in the environment is desirable. Protection from abrasion due to sand/dust and corrosion are important attributes. To test the suitability of these films to meet these requirements a microbead bead blaster or small-scale sand blaster typically used to etch or debur metal parts, remove paint, etc. was used to simulate aggressive accelerated high-speed sand exposure. A ~5 μm film was measured in the single bounce reflection apparatus before and after sand exposure to obtain a 4% Transmission that is plotted for various exposure times of 10, 20, and 60 seconds in FIG. 4. As can be seen in FIG. 5, an unprotected polished aluminum (Al) coupon is rapidly etched and roughened by the stream while a 5 μm coating on that same substrate is effective in preventing this substrate damage. This is reflected in the reduced change in % Transmission seen in protected and unprotected samples.

Example 8. Fluid Challenges

Figure 6:
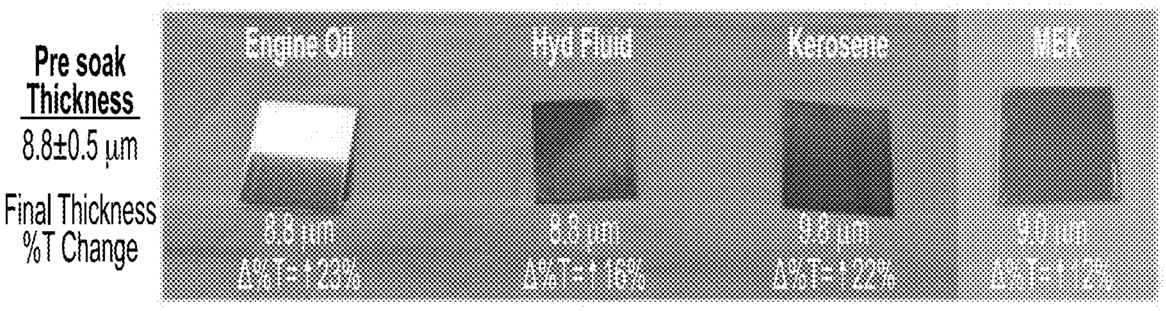
FIG. 6 is an image showing the results of the film applied to a substrate and soaked for 14 days in different fluids at room temperature.

Fluid challenges were also performed on the TMC 2-[2,4-bis(2-mercaptoethyl)cyclohexyl]ethanethiol+polybutadiene 3/5 across a variety of industrially relevant solvents including fuel, engine oil, hydraulic fluid, and methyl ethyl ketone, a common organic solvent used in cleaning of parts. Exposure for 14 days at room temperature across all of these fluids resulted in no significant thickness change or % T decrease, blistering, or delamination (See FIG. 6). In one case with the hydraulic fluid, there was some haze that appeared, but it did not degrade the single bounce transmission character significantly.

Example 9. Color Concentration and Transmission

Figure 7:
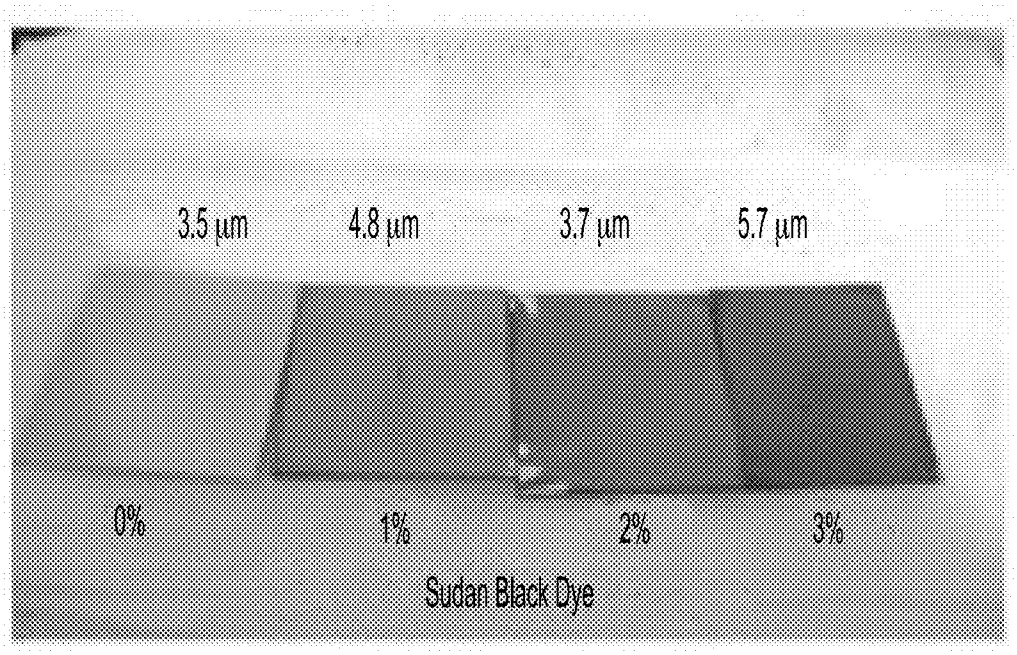
FIG. 7 is an image showing the effect of loading Sudan Black dye at various concentrations.

Sudan Black, an organic dye was added to the composition at various concentrations of 0%, 1%, 2%, and 3% and the transmission was measured by the method described in Example 3. As can be seen in FIG. 7, there was no significant broadband change in transmission loss (4% T) at 1-3% dye or additional characteristic absorption lines from the dye.

Example 10: Synthesis of 10-(3-butyl-2-hexyl-6-(9-mercaptononyl)cyclohexyl)decane-1-thiol-TVC 1/1

10-(3-butyl-2-hexyl-6-(9-mercaptononyl)cyclohexyl)decane-1-thiol (2.00 g, synthesized previously) was combined with trivinylcyclohexane (TVC) (387 mg, Sigma Aldrich) and dissolved in xylenes (7.16 g) in a 20 mL glass scintillation vial.

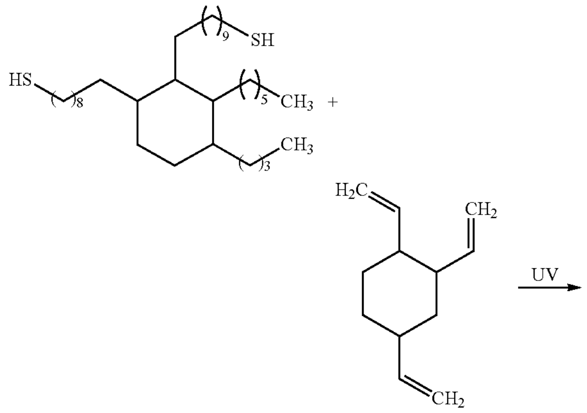

Polished Al plates (1/32" thickness, McMaster Carr) that had previously been treated with a vinyl silane species to act as an adhesion promoter were cut to 3"×3" coupons and placed on a spin coater (MTI Corp VTC-100). A 2 mL aliquot was dropped in the center of the instrument and spun for 180 seconds at 500-3000 rpm.

Figure 8:
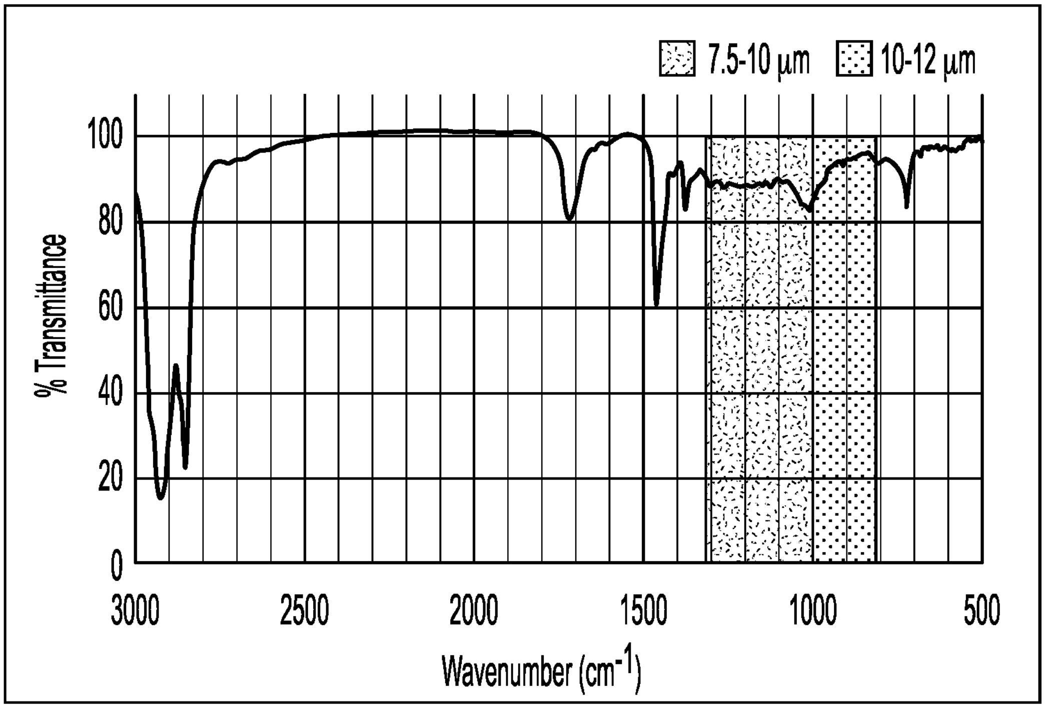
FIG. 8 is a representative spectrum for a 4 μm thick film comprising 10-3-butyl-2-hexyl-6-(9-mercaptononyl)cyclohexyl)decane-1-thiol+TVC on polished Al as described in Example 10.

The film coating the polished Al plate was then cured with a 25 Watt UVC lamp for 2 hours. The transmission was measured as in Example 3. As can be seen in FIG. 8, there is greater than 80% transparency in the infrared spectrum at about 4-5 μm and at about 8.5-12 μm. Additionally, with the 10-(3-butyl-2-hexyl-6-(9-mercaptononyl)cyclohexyl)decane-1-thiol+TVC composition at a weight ratio of 1/1 respectively there is no excess of vinyl groups as with Example 1 wherein excess vinyl groups appear as narrow characteristic absorptions in the 7.5-12 μm window as discussed in Example 3 and shown in the spectrum of FIG. 1.

Example 11: Integrating Sphere

Figure 9:
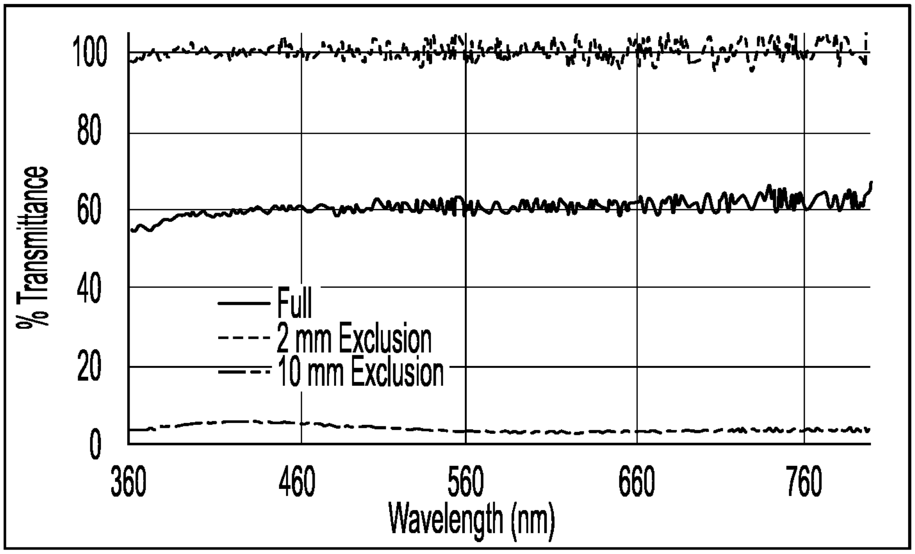
FIG. 9 is a representative spectrum from an integrating sphere on a 4.7 μm thick sample containing 10-3-butyl-2-hexyl-6-(9-mercaptononyl)cyclohexyl)decane-1-thiol+TVC supported an ITO on a glass substrate (15Ω/□) as described in Example 11.

A Perkin Elmer Lambda 950 UV/Vis fitted with a 100 mm integrating sphere attachment was used in transmission mode with an (indium tin oxide) ITO on glass sample as the baseline. Subsequently, a film comprising 10-(3-butyl-2-hexyl-6-(9-mercaptononyl)cyclohexyl)decane-1-thiol+TVC was coated onto the surface by spin coating (1000 rpm, 4.7 μm thickness). Full transmission through this film including direct transmission and diffuse scattering was measured followed by diffuse scattering alone through elimination of the direct beam with a 10 mm diameter aperture (5.8° angular spread) and a 2 mm diameter aperture (1.15° angular spread). FIG. 9 shows the integrating sphere spectrum on a 4.7 μm thick sample comprising 10-(3-butyl-2-hexyl-6-(9-mercaptononyl)cyclohexyl)decane-1-thiol+TVC and ITO glass substrate (15Ω/□). The top curve results from total integrated intensity including direct and diffuse scattering through the film. The bottom curve results from the elimination of direct transmission within a forward cone sweeping out 5.8°. The middle curve results from the elimination of only a 1.15° forward cone.

Example 12: TVC+TMC 1,2,4-trivinylcyclohexane (1.00 g, 6.16 mmols) and 2-[2,4-bis(2-mercaptoethyl)cyclohexyl]ethanethiol (1.63 g, 6.16 mmols) were added to a 10 mL Flaktek speed mixer cup. Reagents were homogenized by mixing in a Flaktek 600 (2 minutes, 2000 rpm). The mixture was aged using a UVC lamp (254 nm UV UVC 25 W) placed ~2" above the cup lip by turning on the lamp while a stir bar aggressively mixed the solution using a 50% duty cycle and 1 Hz frequency. After 20 cumulative minutes of aging the solution was covered in foil to protect from light and stored on the shelf.

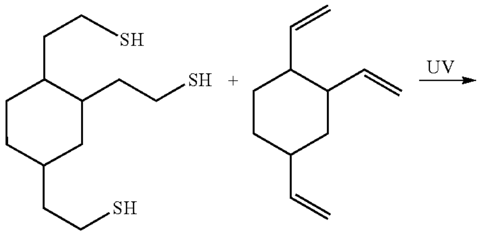

Polished Al plates (1/32" thickness, McMaster Carr) that had previously been treated with a vinyl silane species to act as an adhesion promoter were cut to 3"×3" coupons and placed on a spin coater (MTI Corp VTC-100). A 2 mL aliquot was placed in the center of the instrument spun for 90 seconds at 500 rpm. After an initial 30 seconds of spinning a UVC lamp (254 nm UV UVC 25 W) placed ~2" above the plate was turned on and remained on for the rest of the spin casting cycle to partially cure the film and prevent de-wetting.

Figure 10:
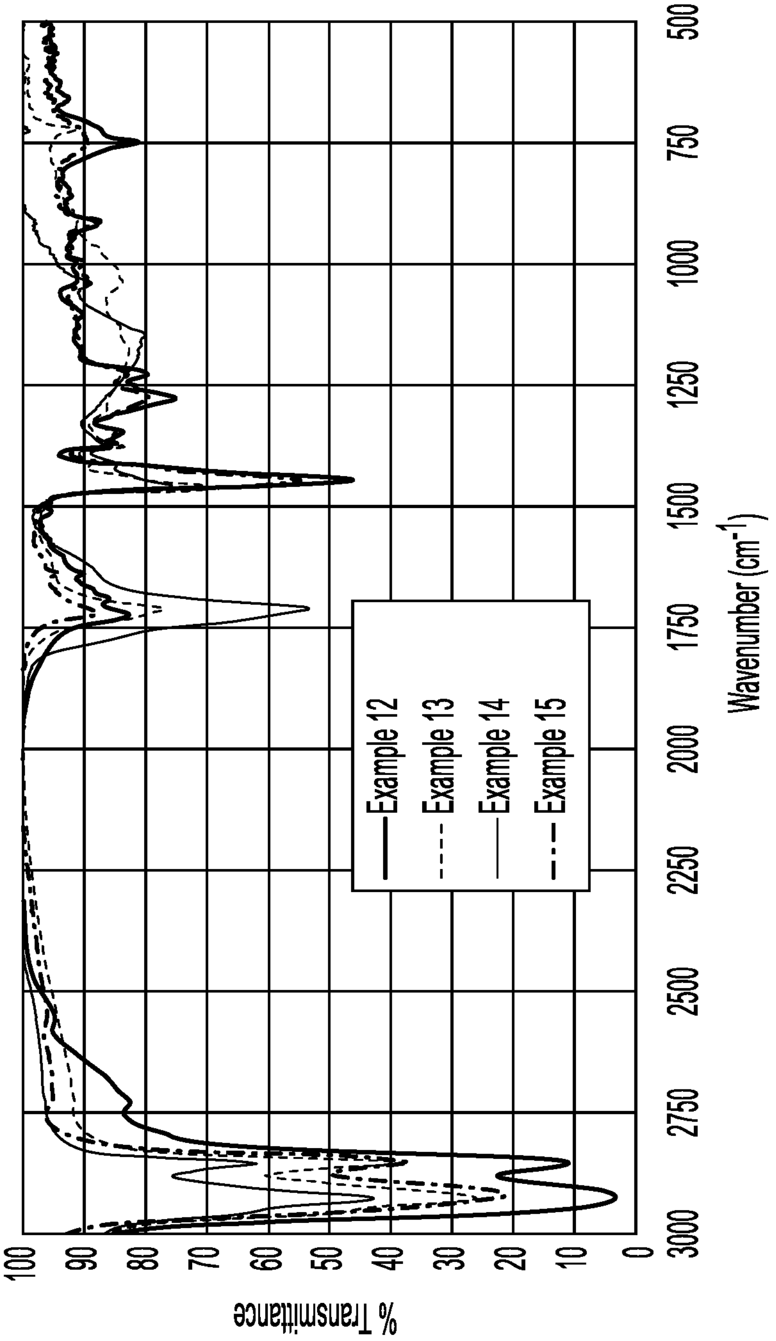
FIG. 10 shows the overlay of the IR transmission of the films of Examples 12-15.

Spin cast samples were then placed in a UVC light box (Dr. UV, H+ Bulb 100 mW/cm$^2$) and irradiated for 1 minute to fully cure. Transmission was measured as in Example 3. FIG. 10 shows that Example 12, without 10-3-(butyl)-2-hexyl-6-(9-mercaptononyl)cyclohexyl)decane-1-thiol, exhibits characteristic peaks associated with the C—S—C bond in the 1220 to 1280 cm-1 region.

Example 13: TMC+10-(3-butyl-2-hexyl-6-(9-mercaptononyl)cyclohexyl)decane-1-thiol 1,2,4-trivinylcyclohexane (500 mg, 3.08 mmols), 10-(3-butyl-2-hexyl-6-(9-mercaptononyl)cyclohexyl)decane-1-thiol (2.63 g, 4.62 mmols), and xylenes (5.65 g) were added to a 10 mL Flaktek speed mixer cup. Reagents were homogenized by mixing in a Flaktek 600 (5 minutes, 2000 rpm).

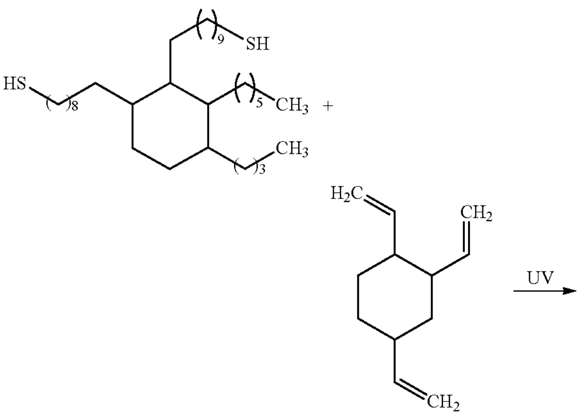

Polished Al plates (1/32" thickness, McMaster Carr) that had previously been treated with a vinyl silane species to act as an adhesion promoter were cut to 3"×3" coupons and placed on a spin coater (MTI Corp VTC-100). A 2 mL aliquot was placed in the center of the instrument spun for 90 seconds at 800 rpm. After an initial 30 seconds of spinning a UVC lamp (254 nm UV UVC 25 W) placed ~2" above the plate was turned on and remained on for the rest of the spin casting cycle to partially cure the film and prevent de-wetting.

Spin cast samples were then placed in a UVC light box (Dr. UV, H+Bulb 100 mW/cm$^2$) and irradiated for 1 minute to fully cure. Transmission was measured as in Example 3. As can be seen from a comparison of the spectrum overlay in FIG. 10, the absorption peaks around about 1220 to 1280 cm-1 are significantly reduced by almost 15% when compared to Example 12. This can be attributed to the addition of 10-(3-butyl-2-hexyl-6-(9-mercaptononyl)cyclohexyl)decane-1-thiol which reacts with the terminal unsaturated functional groups of the multifunctional terminally unsaturated copolymer to significantly reduce or eliminate the unreacted species that contribute to absorption. This is a desirable feature and significant effect of 10-(3-butyl-2-hexyl-6-(9-mercaptononyl)cyclohexyl)decane-1-thiol and improves absorption across the 1400 to 1800 cm-1 region.

Example 14: TVC+10-(3-butyl-2-hexyl-6-(9-mercaptononyl)cyclohexyl)decane-1-thiol+Polybutadiene 1,2,4-trivinylcyclohexane (250 mg, 1.54 mmols), 10-(3-butyl-2-hexyl-6-(9-mercaptononyl)cyclohexyl)decane-1-thiol (2.63 g, 4.62 mmols), polybutadiene (90% 1,2 addition) (280 mg, 4.62 mmolar vinyl) and xylenes (5.65 g) were added to a 10 mL Flaktek speed mixer cup. The reagents were homogenized by mixing in a Flaktek 600 (5 minutes, 2000 rpm).

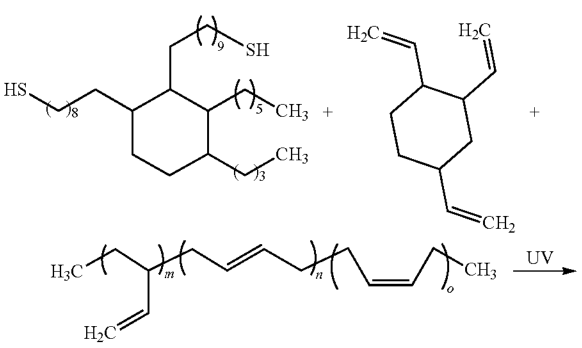

Polished Al plates (1/32" thickness, McMaster Carr) that had previously been treated with a vinyl silane species to act as an adhesion promoter were cut to 3"x3" coupons and placed on a spin coater (MTI Corp VTC-100). A 2 mL aliquot was placed in the center of the instrument spun for 90 seconds at 600 rpm. After initial 30 seconds of spinning a UVC lamp (254 nm UV UVC 25 W) placed ~2" above the plate was turned on and remained on for the rest of the spin casting cycle to partially cure the film and prevent de-wetting.

Spin cast samples were then placed in a UVC light box (Dr. UV, H+Bulb 100 mW/cm$^2$) and irradiated for 1 minute to fully cure. Transmission was measured as in Example 3. FIG. 10 shows that similar to Example 13, the absorption peaks around about 1220 to 1280 cm-1 are significantly reduced by almost 15% when compared to Example 13, which can be attributed to the addition of 10-(3-butyl-2-hexyl-6-(9-mercaptononyl)cyclohexyl)decane-1-thiol which reacts with of the terminal unsaturated functional groups of the multifunctional terminally unsaturated copolymer to significantly reduce or eliminate the unreacted species that contribute to absorption.

Example 15: TVC+10-(3-butyl-2-hexyl-6-(9-mercaptononyl)cyclohexyl)decane-1-thiol+Polybutadiene 1,2,4-trivinylcyclohexane (746 mg, 4.60 mmols) 2-[2,4-bis(2-mercaptoethyl)cyclohexyl]ethanethiol (1.54 g, 5.82 mmols), 10-(3-butyl-2-hexyl-6-(9-mercaptononyl)cyclohexyl)decane-1-thiol (260 mg, 0.46 mmols), polybutadiene (90% 1,2 addition) (280 mg, 4.62 mmolar vinyl) and xylenes (5.65 g) were added to a 10 mL Flaktek speed mixer cup. The reagents were homogenized by mixing in a Flaktek 600 (5 minutes, 2000 rpm).

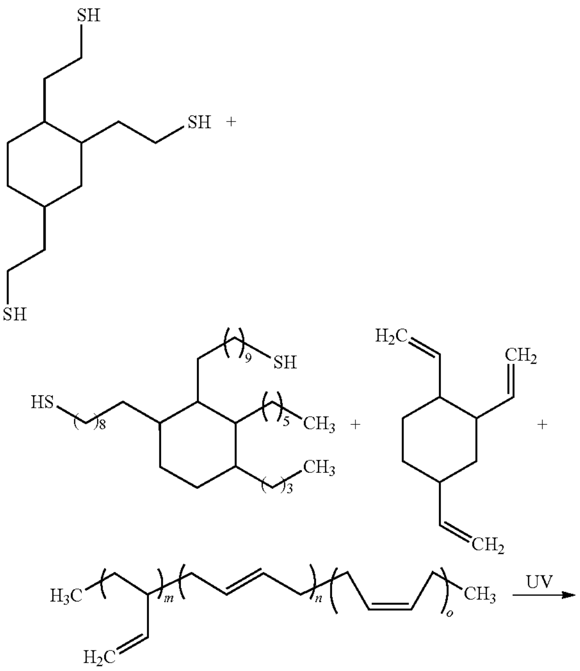

Polished Al plates (1/32" thickness, McMaster Carr) that had previously been treated with a vinyl silane species to act as an adhesion promoter were cut into 3"x3" coupons and placed on a spin coater (MTI Corp VTC-100). A 2 mL aliquot was placed in the center of the instrument and spun for 90 seconds at 600 rpm. After an initial 30 seconds of spinning a UVC lamp (254 nm UV UVC 25 W) placed ~2" above the plate was turned on and remained on for the rest of the spin casting cycle to partially cure the film and prevent de-wetting.

Spin cast samples were then placed in a UVC light box (Dr. UV, H+Bulb 100 mW/cm$^2$) and irradiated for 1 minute to fully cure. Transmission was measured as in Example 3. FIG. 11 shows that, in comparison to Example 12, the absorption peaks around about 1220 to 1280 cm-1 are significantly reduced by almost 5% despite the additional terminally unsaturated hydrocarbon monomer component due to the addition of the 10-(3-butyl-2-hexyl-6-(9-mercaptononyl)cyclohexyl)decane-1-thiol, which reacts with the terminal unsaturated functional groups of the multifunctional terminally unsaturated copolymer to significantly reduce or eliminate the unreacted species that contribute to absorption.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A polymer composition comprising:

a thiol-containing copolymer which comprises (1) 10-(3-butyl-2-hexyl-6-(9-mercaptononyl)cyclohexyl) decane-1-thiol; and (2) at least one multifunctional terminally unsaturated hydrocarbon monomer;

wherein (1) and (2) are combined to form a UV curable crosslinked thermoset polymer network, and particulate fillers are not added to the composition; and wherein the composition exhibits a specular transmission of greater than 70% in a visual spectrum at about 400-700 nm, and IR wavelengths at about 4-5 μm, and about 7.5-12 μm when applied to a surface of a substrate in a coating thickness of about 1 to 500 μm.

2. The polymer composition according to claim 1, wherein the thiol-containing copolymer further comprises (3) at least one multifunctional thiol-terminated hydrocarbon monomer comprising a hydrocarbon interior.

3. The polymer composition according to claim 1, further comprising one or more of a solvent, an initiating agent, a pigment, a dye, an antioxidant, and a UV stabilizer.

4. The polymer composition according to claim 2, wherein the multifunctional thiol-terminated hydrocarbon monomer is 2-[2,4-bis(2-mercaptoethyl)cyclohexyl]ethanethiol, 1,3,5, tris(2-mercaptoethyl)cyclohexane or α,ω-thiol-terminated hydrogenated polybutadiene, and mixtures thereof.

5. The polymer composition according to claim 1, wherein the at least one multifunctional terminally unsaturated hydrocarbon monomer is 1,2,4-trivinylcyclohexane.

6. The polymer composition according to claim 1, wherein the at least one multifunctional terminally unsaturated hydrocarbon monomer comprises 1,2,4-trivinylcyclohexane and polybutadiene.

7. The polymer composition according to claim 2, wherein the at least one multifunctional thiol-terminated hydrocarbon monomer is 2-[2,4-bis(2-mercaptoethyl)cyclohexyl]ethanethiol, and the at least one multifunctional terminally unsaturated hydrocarbon monomer comprises 1,2,4-trivinylcyclohexane and polybutadiene.

8. A film comprising a polymer composition which comprises:

a thiol-containing copolymer which comprises (1) 10-(3-butyl-2-hexyl-6-(9-mercaptononyl)cyclohexyl) decane-1-thiol; and (2) at least one multifunctional terminally unsaturated hydrocarbon monomer;

wherein (1) and (2) are combined to form a UV curable crosslinked thermoset polymer network and particulate fillers are not added to the composition;

wherein said polymer composition is applied to a surface of a substrate and cured by UVC light or UV light to form the film; and wherein the film exhibits a specular transmission of greater than 70% in a visual spectrum at about 400-700 nm, and IR wavelengths at about 4-5 μm, and about 7.5-12 μm when applied to a surface of a substrate in a coating thickness of about 1 to 500 μm.

9. The film according to claim 8, wherein the thiol-containing copolymer further comprises (3) at least one multifunctional thiol-terminated hydrocarbon monomer comprising a hydrocarbon interior.

10. The film according to claim 8, wherein the at least one multifunctional terminally unsaturated hydrocarbon monomer is 1,2,4-trivinylcyclohexane.

11. The film according to claim 8, wherein the at least one multifunctional terminally unsaturated hydrocarbon monomer comprises 1,2,4-trivinylcyclohexane and polybutadiene.

12. The film according to claim 9, wherein the thiol-containing copolymer comprises 10-(3-butyl-2-hexyl-6-(9-mercaptononyl)cyclohexyl) decane-1-thiol and (2-[2,4-bis (2-mercaptoethyl)cyclohexyl]ethanethiol), and the at least one multifunctional terminally unsaturated hydrocarbon monomer comprises 1,2,4-trivinylcyclohexane and polybutadiene.

13. The film according to claim 9, wherein the film is further cured by exposure to electron beam radiation.

14. The film according to claim 9, wherein the polymer composition applied to the surface of the substrate is cured by UVC light or UV light without addition of an initiating agent.

15. The film according to claim 9, wherein the polymer composition applied to the surface of the substrate is cured by UVC light or UV light with addition of a photoinitiator.

16. A method for making a film comprising:

providing a thiol-containing copolymer which comprises 10-(3-butyl-2-hexyl-6-(9-mercaptononyl)cyclohexyl) decane-1-thiol;

providing at least one multifunctional terminally unsaturated hydrocarbon monomer;

dissolving the thiol-containing copolymer which comprises 10-(3-butyl-2-hexyl-6-(9-mercaptononyl)cyclohexyl) decane-1-thiol and the at least one multifunctional terminally unsaturated hydrocarbon monomer in a solvent and forming a reaction mixture;

depositing the reaction mixture onto a surface of a substrate to form a coating; and curing the coating with UVC light or UV light to form the film.

17. The method according to claim 16, wherein the thiol-containing copolymer further comprises a multifunctional thiol-terminated hydrocarbon monomer.

18. The method of claim 16, wherein the thiol-containing copolymer further comprises a monofunctional thiol-terminated hydrocarbon monomer or a monofunctional thiol-terminated hydrocarbon monomer.

19. The method according to claim 16, further comprising, after forming a reaction mixture, partially reacting the thiol-containing copolymer and the at least one multifunctional terminally unsaturated hydrocarbon monomer in the reaction mixture by exposure to UVC light.

20. The method according to claim 16, further comprising exposing the film to electron beam radiation.

21. The method according to claim 16, wherein curing the coating with UVC light or UV light, includes addition of a photoinitiator.

22. The method according to claim 16, wherein curing the coating with UVC light or UV light is without addition of an initiating agent.

23. The method according to claim 16, wherein the at least one multifunctional terminally unsaturated hydrocarbon monomer is 1,2,4-trivinylcyclohexane.

24. The method according to claim 16, wherein the at least one multifunctional terminally unsaturated hydrocarbon monomer comprises 1,2,4-trivinylcyclohexane and polybutadiene.

25. The method according to claim 17, wherein the thiol-containing copolymer comprises 10-(3-butyl-2-hexyl-6-(9-mercaptononyl)cyclohexyl) decane-1-thiol (1) and 2-[2,4-bis(2-mercaptoethyl)cyclohexyl]ethanethiol, and the at least one multifunctional terminally unsaturated hydrocarbon monomer comprises 1,2,4-trivinylcyclohexane and polybutadiene.

26. A window comprising a substrate and a thin film according to claim 8 applied to a surface of the substrate.

* * * * *